United States Patent
Bhattacharjee et al.

(10) Patent No.: US 8,117,201 B2
(45) Date of Patent: Feb. 14, 2012

(54) PRE-POPULATED AND ADMINISTRATOR DEFINED GROUPS IN CONTACTS LISTS

(75) Inventors: Avronil Bhattacharjee, Redmond, WA (US); Amit Gupta, Redmond, WA (US); Cindy Kwan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 12/471,399

(22) Filed: May 24, 2009

(65) Prior Publication Data

US 2010/0299363 A1 Nov. 25, 2010

(51) Int. Cl.
G06F 7/00 (2006.01)
G06F 17/30 (2006.01)
(52) U.S. Cl. .......... 707/736; 707/752; 707/756
(58) Field of Classification Search .......... None
See application file for complete search history.

(56) References Cited

U.S. PATENT DOCUMENTS 6,968,052 B2 11/2005 Wullert, II
6,993,327 B2 * 1/2006 Mathis .................. 455/414.1
2006/0010206 A1 * 1/2006 Apacible et al. .............. 709/205
2007/0168529 A1 * 7/2007 Taylor et al. .................. 709/229
2008/0065758 A1 3/2008 Narayanaswami
2008/0133580 A1 6/2008 Wanless et al.
2008/0207271 A1 8/2008 Krutik et al.
2008/0263076 A1 10/2008 Duffield et al.
2009/0089316 A1 * 4/2009 Kogan et al. .................. 707/102
2009/0104895 A1 * 4/2009 Kasturi et al. .............. 455/414.1

OTHER PUBLICATIONS

Hallberg, et al."Creating Dynamic Groups using Context-Awareness", Retrieved at<<http://media.csee.ltu.se/projects/MobiGroup/papers/Creating%20Dynamic%20Groups%20using%20Context-awareness.pdf>>, MUM'07, Dec. 12-14, 2007, Oulu, Finland, pp. 42-49.
Law, et al."Smart Instant Messenger in Pervasive Computing Environments", Retrieved at<<http://i.cs.hku.hk/~clwang/papers/GPC2006-SIM-Camera.pdf>>, pp. 10.
"Contact List Management", Retrieved at<<http://communicatorteam.com/archive/2008/03/13/122.aspx>>, pp. 6.

* cited by examiner

Primary Examiner — Jay Morrison
(74) Attorney, Agent, or Firm — Turk IP Law, LLC

(57) ABSTRACT

A contacts list for a subscriber is pre-populated based on information received from various data stores, data mining of applications associated with the subscriber, and administrator defined contacts. The list may be further maintained dynamically based on changes to contact information and/or subscriber attributes.

18 Claims, 7 Drawing Sheets

PRE-POPULATED AND ADMINISTRATOR DEFINED GROUPS IN CONTACTS LISTS

BACKGROUND

Modern communication systems that can provide a large number of capabilities including integration of various communication modalities with different services enable a wider array of communication between people. Social networking applications, multimodal enterprise communication applications, and comparable ones are examples of rapidly proliferating communication systems taking advantage of the modern capabilities.

Many multimodal communication, social networking, and instant messaging applications provide an empty contacts list when they are activated/installed first time. Users are typically required to search and manually add contacts to the contacts list, import from other sources, or perform a combination of these operations before any type of communication and collaboration activity can be initiated. The generation, maintenance, and organization of the contacts list may be a tedious and time consuming task. Because the contacts list is the main entry point for many tasks in multimodal communication, social networking, and instant messaging applications, users who do not maintain a contacts list may end up not using the application.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to pre-populating a contacts list of a subscriber for a communication application based on information received from various data stores, data mining of applications associated with the subscriber, and administrator defined contacts. The list may be further maintained dynamically following the pre-population upon activation.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
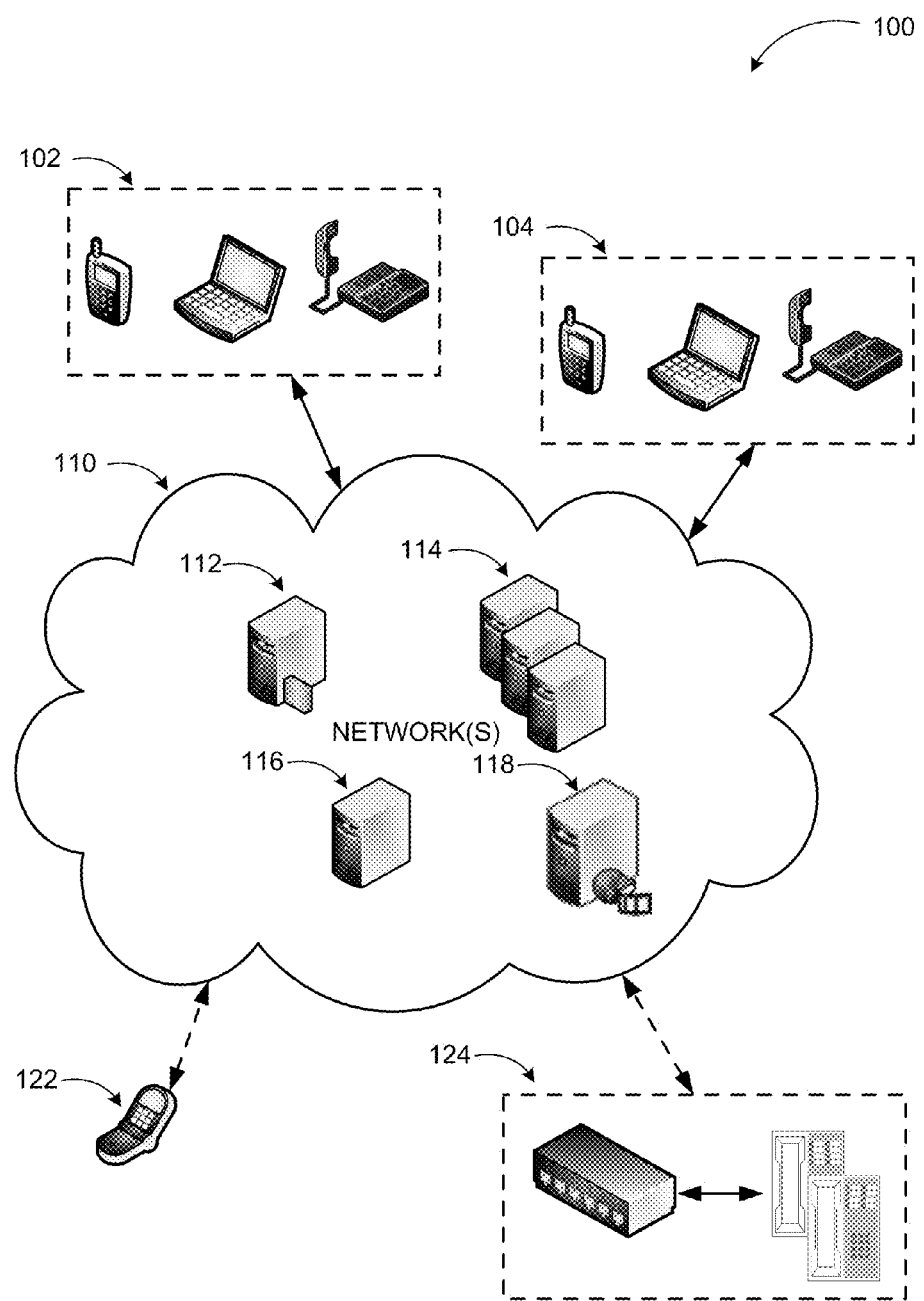
FIG. 1 is a diagram illustrating an example unified communications system, where embodiments may be implemented for pre-populating contacts lists.

As briefly described above, contacts lists for communication applications in settings such as social networks may be pre-populated and dynamically maintained based on a variety of sources. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing alternate contacts lists. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "dynamic" as used in conjunction with maintenance of contacts lists is intended to illustrate the distinction between conventional approaches, where statically stored and managed information is used with rigid rules, and embodiments, which enable creation and updating of contacts information based on frequently changing parameters such as subscriber presence.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

A UC system may provide a platform for social networking, multimodal enterprise communications, and similar environments. When a subscriber joins such an environment, one of the first tasks they have to perform is populate their contacts list so they can start taking advantage of the capabilities of their enhanced communication application(s). In a system according to embodiments, the contacts list may be pre-populated before first use for each subscriber based on data from a variety of sources such as administrator defined groups. More detailed examples are discussed below.

While the example system in FIG. 1 has been described with specific components such as mediation server, A/V server, and similar devices, embodiments are not limited to these components or system configurations and can be implemented with other system configuration employing fewer or additional components. Functionality of systems pre-populating contacts lists based on a variety of sources may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
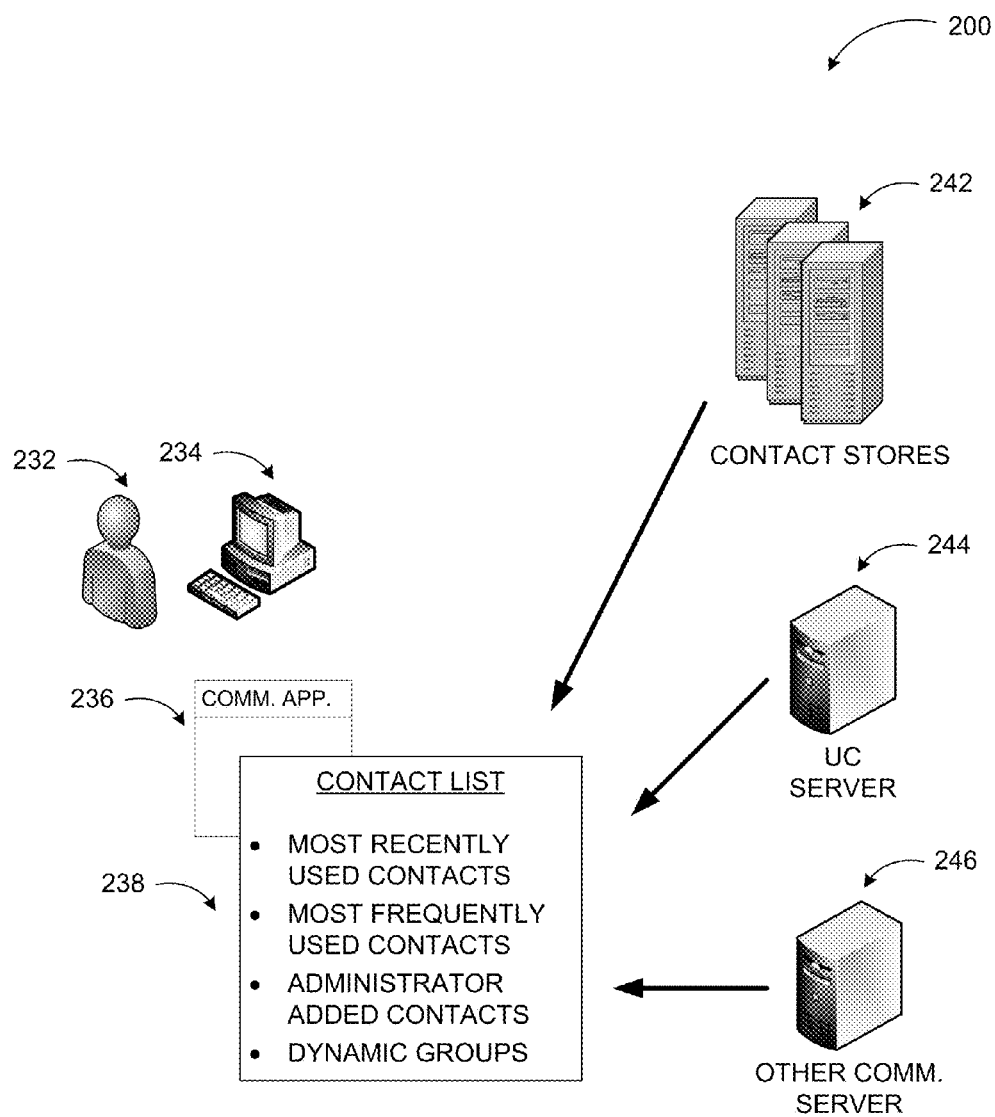
FIG. 2 is a conceptual diagram illustrating pre-population of contacts lists based on information from different sources according to embodiments.

FIG. 2 includes conceptual diagram 200 illustrating pre-population of contacts lists based on information from different sources according to embodiments. While a system according to embodiments is likely to include a number of servers and services such as those illustratively discussed in FIG. 1, only those relevant to embodiments are shown in FIG. 2.

Subscriber 232 may have just joined an organization such as a social network, an enterprise network, or similar ones. To interact with other subscribers and even external contacts through a communication application (236) executed on computing device 234, one of the main tools for subscriber 232 is contacts list 238. The contacts list 238 provides not only contact information for select people and resources, but also allows the contacts to be grouped for ease of use, provides additional information such as presence information associated with the contacts, and the like. Pre-populating the contacts list can enhance the first run experience and eliminate the need for subscriber 232 to generate, maintain, and organize their contacts list.

Pre-population may be achieved by data received from a variety of sources. For example, a number of contact data stores 242 may be available within the communication system such as a directory of all system subscribers or distinct data stores for various groups of subscribers. Another source may include administrator defined contacts such as organizational help, security, information contacts. These may be managed by a separate server of the system such as a UC server 244. Yet another source of contact information may include contacts for specific types of communication. For example, an electronic mail management server (e.g. other communication server 246) may manage contacts for electronic mail applications. However, in an enhanced communication system, such contact information may also be utilized (at least partially) by a multimodal communication application.

According to some embodiments, the contact data from these various sources may be analyzed, grouped, and customized prior to pre-populating subscriber 232's contacts list 238. Various parameters such as subscriber 232's relationships within the organization, location, preference(s), position, permission levels, and similar attributes may be employed in analyzing, grouping, and customizing the data. For example, Administrator defined contact information may include helpdesk contacts, security contacts, and library information contacts for members of a multi-national organization. The contact information may be customized based on a location of each subscriber.

According to another example scenario, contact data stores 242 may include all members' contact information for a relatively large organization. Thus, pre-loading all of that information onto the new subscriber's contacts list would not provide a user-friendly solution to the subscriber. On the other hand, the data may be filtered based on the subscriber's position and relationships within the organization and grouped based on the same (e.g. my sales team, my engineering team, my direct-reports, etc.).

Another example scenario includes contact information that may be a result of data mining in various data stores associated with the subscriber. Following the electronic mail example discussed above, subscriber 232 may have been using the electronic mail service for some time, but just joined the multimodal communication service. Contacts list 238 for subscriber 232's multimodal communication application 236 may be pre-populated based on contacts with whom subscriber 232 exchanged email in the last 6 months (or any other predefined period). The analysis, grouping, and customization parameters may be defined in the system as rules such that the pre-population process can be accomplished automatically. The rules may be further customizable based on attributes of the subscribers. For example, different time periods may be defined for data mining contact stores for different subscriber levels (a manager's information may be derived from records for the past year, where an assistant's information may be derived from records for the past 6 months).

Another aspect of pre-populating contacts lists based on analyzed, grouped, and customized data from various data sources is that the data may be dynamically updated. Returning to the example of the organizational relationships, members of teams may change by people moving, leaving, joining, etc. Since the pre-populated contacts list receives it "team" information from the server responsible for the up-to-date contact information for the whole organization, the subscriber does not have to worry about manually updating his/her contacts list regularly.

According to a further embodiment, the contacts lists may be pre-populated based on a location of the subscriber or communication device. For example, when the subscriber travels between different locations of an organization important contact information such as local transportation contact information, local helpdesk information, and similar localized information may be pre-populated in the subscriber's contact list dynamically. Another example implementation of location based dynamic groups is communication devices used by multiple subscribers such as lobby phones. These devices may be pre-configured with a contact list that includes receptionist, security, transportation service, and the like for a particular location. When one of those devices is moved to another location, the contacts list pre-programmed into the device may be updated automatically based on the new location without requiring manual re-programming of the device.

Figure 3:
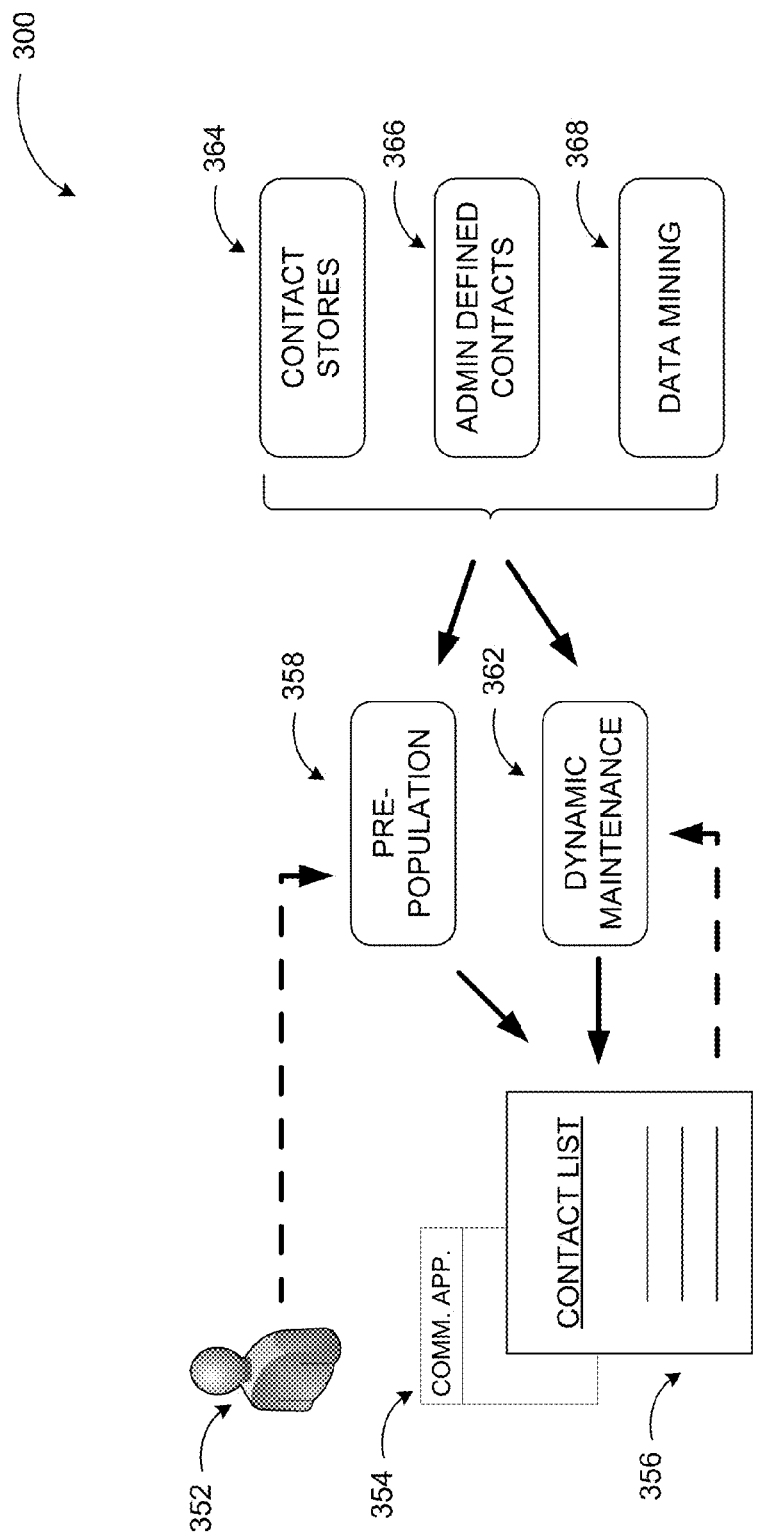
FIG. 3 is another conceptual diagram illustrating pre-population and dynamic maintenance of contacts lists based on information from different sources according to embodiments.

FIG. 3 is another conceptual diagram 300 illustrating pre-population and dynamic maintenance of contacts lists based on information from different sources according to embodiments. As discussed above information to pre-populate the contacts list 356 for subscriber 352's communication application 354 may be derived from a number of data sources.

A portion of the data may be from static or dynamic data sources such as directory server, presence servers, and others grouped under contact stores 364. Contact stores 364 may be determined by the system automatically or defined by the subscriber (e.g. personal contact stores). Another portion of the data may be provided by administrator defined contacts store 366. An administrator of the communication system may provide static and/or dynamic contact information for certain default contacts to subscribers of the communication system. Yet another source for contacts list may include data mining (368) of data associated with certain applications such as electronic mail history, text messaging history, conferencing records, and comparable ones.

The data from these resources may be analyzed, categorized, and customized based on subscriber attributes (position within an organization, location, permission levels, relationships, etc.). Additional processing may include duplicate record resolution or similar operations. For a multimodal communication application, the contact groups may be formed such that they can support desired modalities. Alternatively, communication capabilities of individual contacts may be presented to the subscriber.

According to one embodiment, the contacts list 356 may be pre-populated (358) in response to the subscriber joining the system, requesting the pre-population, or a similar trigger event. According to another embodiment, the contacts list 356 may be dynamically maintained (records updated) (362) in response to changes in the data sources (dynamic contact data) or changes in the subscriber's attributes, communication patterns, and the like.

While embodiments are described with reference to "contacts", this term should not be construed as being limited to a contacts list in context of an email or calendaring application. Contact, as used herein, refers to a broader understanding about letting others know who is in the user's social network. For example, the contact information may be utilized in conjunction with "expert search" or "knowledge base" (a user trying to find an "expert" who is related to them or someone they know). Another example utilization area is "social awareness" and "team building" (i.e. having a sense of who someone is working with regularly can spur impromptu conversations and facilitate better collaboration, particularly across groups). Users may wish to reveal more presence data to colleagues of their colleagues than to others in their enterprise generally.

Figure 4:
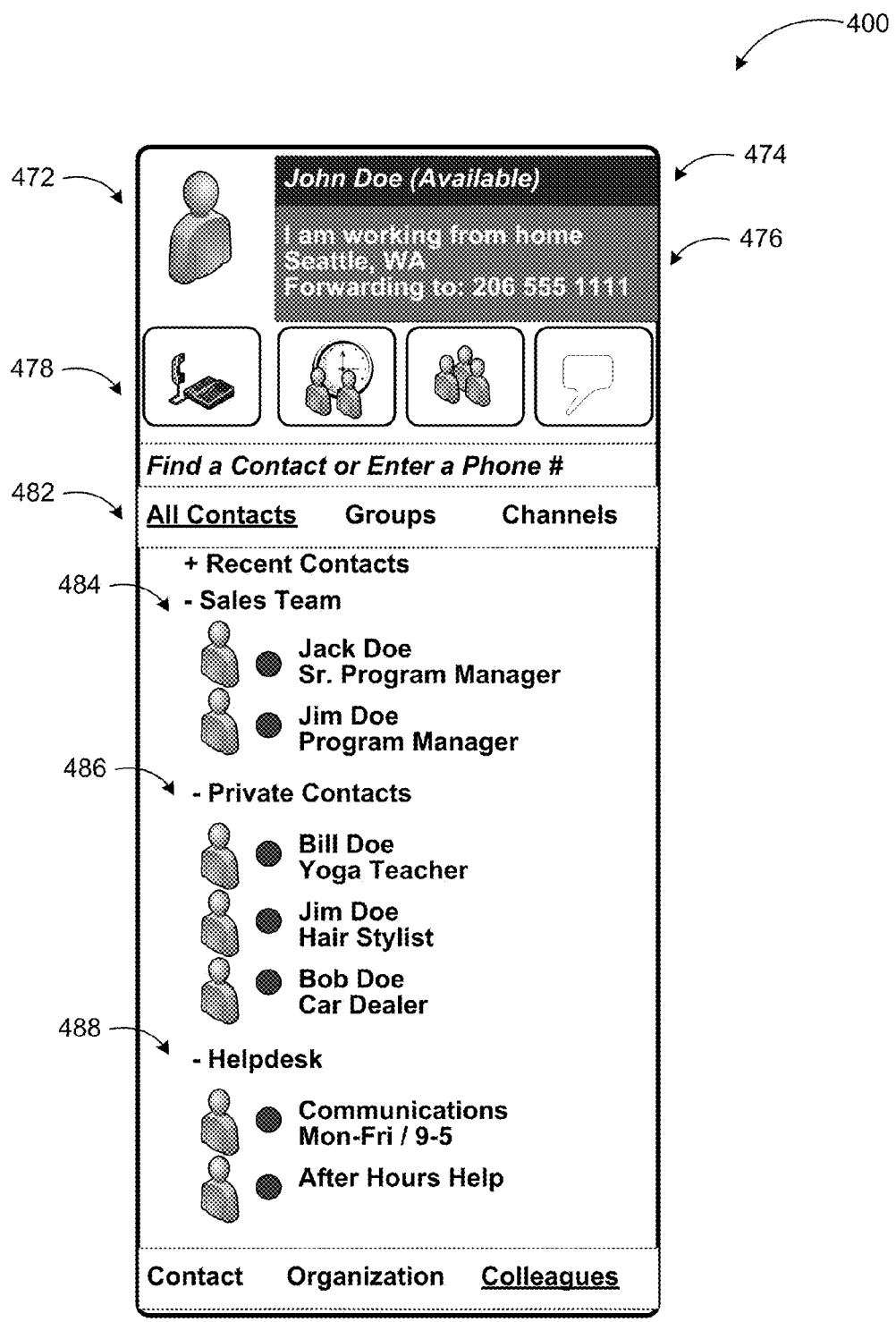
FIG. 4 is a screenshot of an example communication application user interface with pre-populated contact information.

FIG. 4 is a screenshot 400 of an example communication application user interface with pre-populated contact information. Communication applications such as communication application 236 of FIG. 2 employing pre-populated contacts lists may utilize any type of user interface, an example one with select features is shown in screenshot 400.

The user interface may include a picture (472), name and status (474), and current location (476) of the subscriber. Graphical icons 478 for activating various communication modes (e.g. phone call, conference call, text messaging, etc.) may provide the subscriber with alternative methods of initiating (or answering) various communication sessions. A portion of the user interface (482) may enable the subscriber to select among different options for communication such as selecting a contact from contacts list, selecting a group, or selecting a channel.

The contacts may be presented in groups as discussed previously. These may include recent contacts (not expanded in the figure), sales team 484, private contacts 486, and helpdesk 488. The last three categories are also examples of contact information that may be derived from different sources. Sales team 484 may be derived from an enterprise-wide directory server, private contacts 486 may be derived from a private address book of the subscriber associated with their electronic mail application, and helpdesk 488 may be defined by the system administrator. Each of the groups may be customized (e.g. filtered, ordered) based on pre-defined data mining or subscriber attribute rules. The contacts may be displayed in many forms including textual, graphical, and other forms of presentation, which may include additional functionality.

The above discussed scenarios, example systems, contact information, or applications are for illustration purposes. Embodiments are not restricted to those examples. Other forms of subscriber data, customization or grouping methods, and applications may be used in implementing pre-population of contacts lists in a similar manner using the principles described herein.

Figure 5:
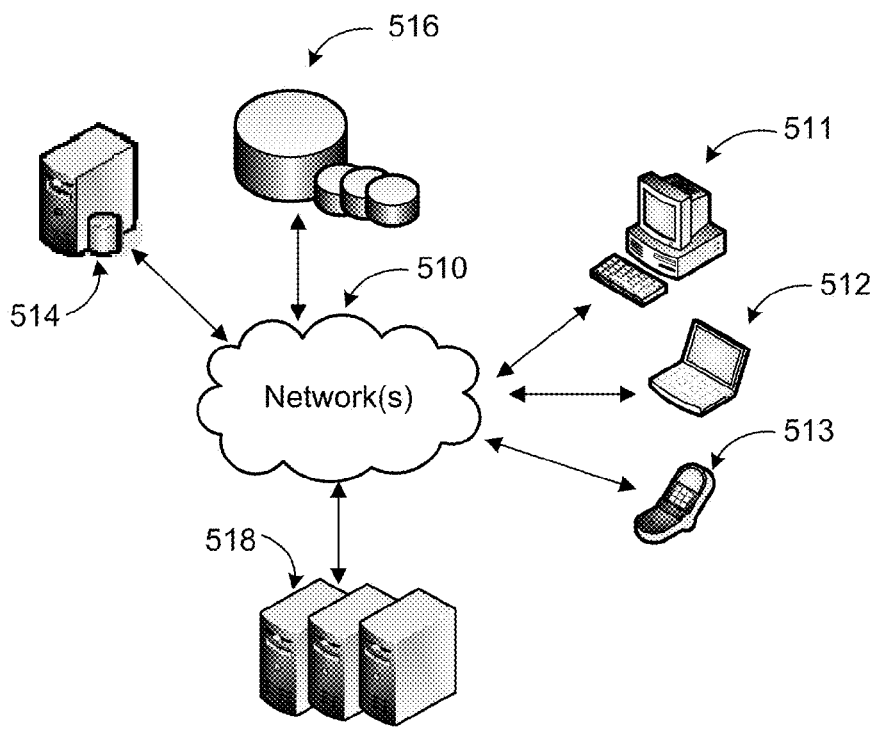
FIG. 5 is a networked environment, where a system according to embodiments may be implemented.

FIG. 5 is an example networked environment, where embodiments may be implemented. A platform providing communication services may be implemented via software executed over one or more servers 518 such as a hosted service. The platform may communicate with client applications on individual computing devices such as a cellular phone 513, a laptop computer 512, and desktop computer 511 ('client devices') through network(s) 510.

As discussed above, modern communication technologies such as UC services enable subscribers to utilize a wide range of computing device and application capabilities in conjunction with communication services. Furthermore, subscribers are also provided presence information including location, contact information, alternative contacts, availability status, calendar information, and similar data that may be used in determining whether or not to initiate communication with a subscriber, which mode of communication, and similar decisions.

As discussed previously, client devices 511-513 are used to facilitate communications employing a variety of modes between subscribers of the communication system. Static contact information such as directory store records, dynamic information such as presence information, and other data are provided to the client applications executed on client devices 511-513 along with administrator defined contacts information by pre-populating the contacts list(s) associated with the client applications when a user becomes a subscriber of the system or another predefined trigger event occurs. Information associated with subscribers and facilitating communications such as administrator defined groups or presence information may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a system for pre-populating and dynamically maintaining contact information. Furthermore, the networked environments discussed in FIG. 5 are for illustration purposes only. Embodiments are not limited to the example applications, modules, or processes.

Figure 6:
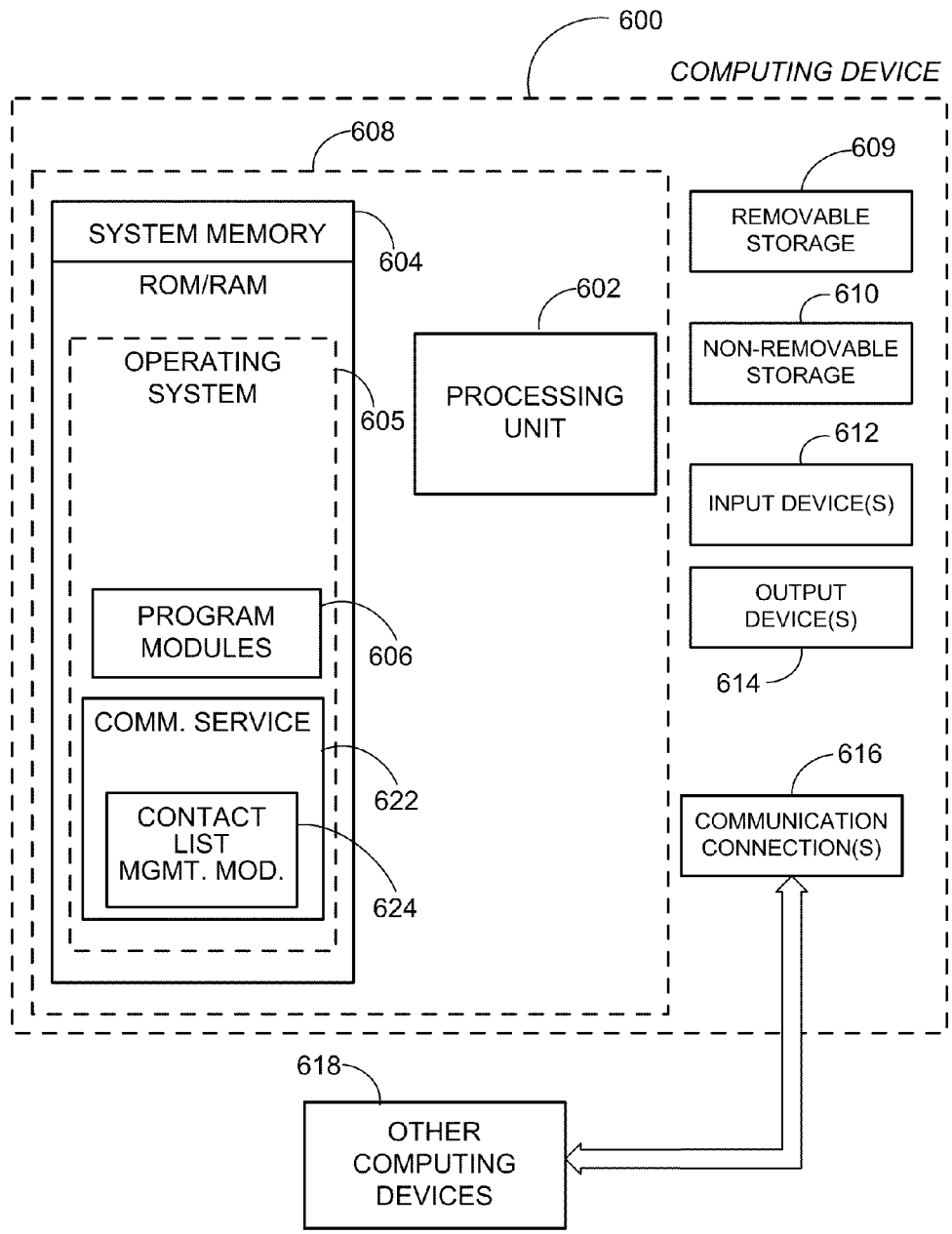
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a communication application (e.g. a social networking service) and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication application 622, and contact list management module 624.

Communication application 622 may be any application that facilitates communication between client applications and servers relevant to an enhanced communication system. Contact list management module 624 may receive pre-populated contact information upon activation from a variety of sources such as a directory server, an electronic mail server, a presence server, and so on as discussed previously. The contacts list may be dynamically updated subsequently based on information received from the same or additional sources. Contact list management module 624 and application 622 may be separate applications or integral modules of a hosted service that provides enhanced communication services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or presence servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
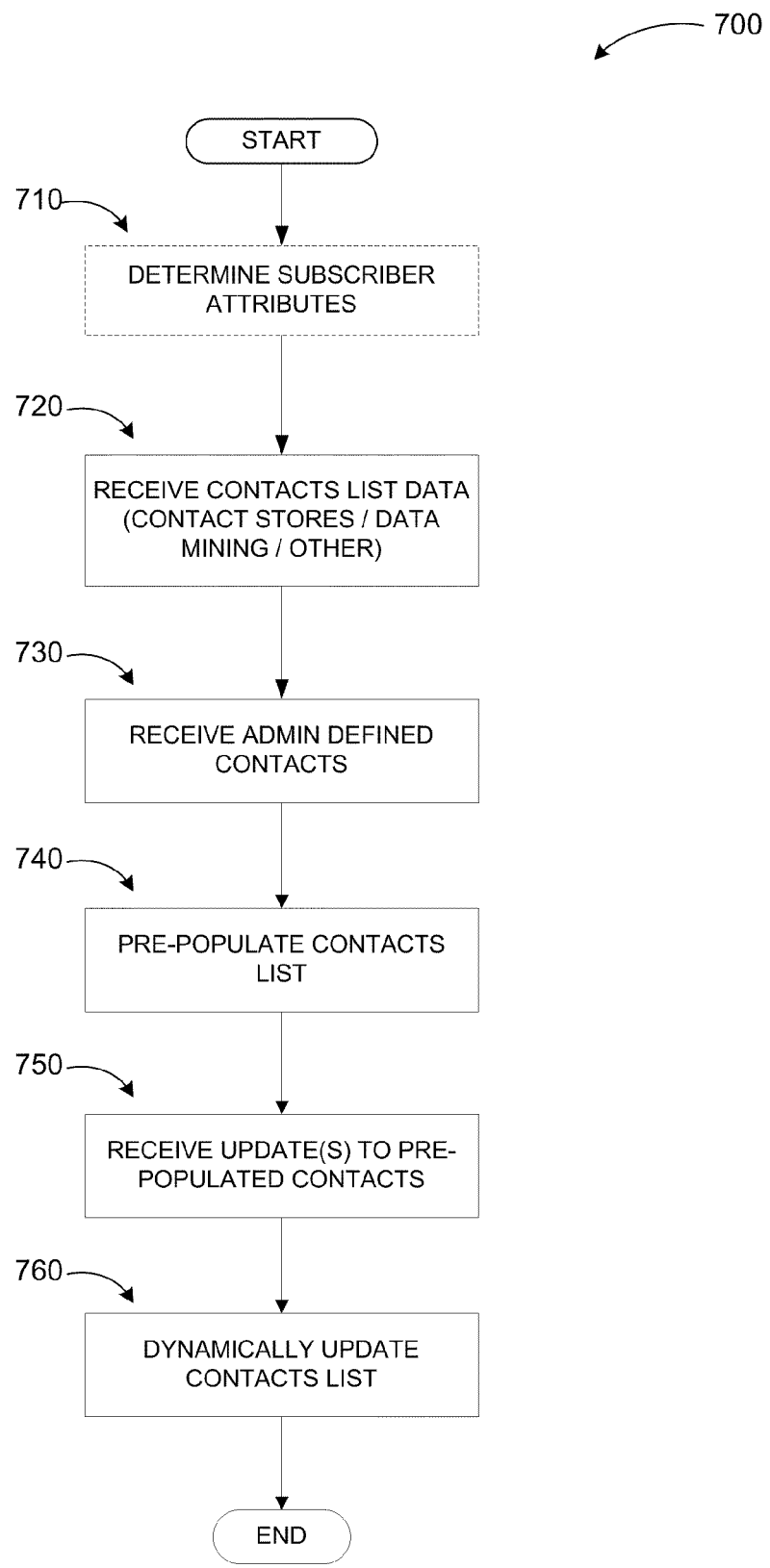
FIG. 7 illustrates a logic flow diagram for pre-populating and dynamically maintaining contacts lists according to embodiments.

FIG. 7 illustrates a logic flow diagram for process 700 of pre-populating and dynamically maintaining contacts lists according to embodiments. Process 700 may be implemented as part of an enhanced communication system capable of facilitating audio communication, video communication, electronic mail exchange, text messaging, conferencing, application sharing, data sharing, or similar communications.

Process 700 begins with optional operation 710, where attributes of the subscriber may be determined. Since contact list information may be closely associated with a subscriber's position within an organization, relationships, preferences, permission levels, communication patterns, and comparable attributes, determining as many of those as possible prior to retrieving data and performing any analysis may be useful.

At operation 720, contact list data is received from a variety of sources. These sources may include contact data stores, electronic mail stores, and similar ones. Some of the data may be received based on an identity of the subscriber. Other portions of the data may be mined/analyzed based on the subscriber's attributes prior to being compiled. Thus, contacts list entries may be derived from the received data based on data mining usage and communication pattern records associated with the subscriber, analyzing the contact information based on the subscriber's attribute, and categorizing according to a subscriber preference, an organizational default rule, or attributes of the contacts list entries. The data sources may also include a directory server, a database server, and an endpoint of the communication system.

At operation 730, administrator defined contacts are received. These may be a default set of contacts for an entire organization, for groups within an organization, or individually tailored sets of contacts based on subscriber attributes (e.g. location of subscriber may determine which helpdesk contact information they get).

At operation 740, the contacts list for the subscriber is pre-populated such that the subscriber can promptly begin using their communication application and take advantage of the capabilities such as initiating communication session(s) with their contacts, scheduling events inviting their contacts, and so on.

At operation 750, updates may be received to the pre-populated contacts list. Some or all of the contacts in the contacts list may include presence information or other dynamic information, which may be updated regularly or upon demand. Furthermore, changes in the subscriber's own presence or attributes may also result in updating of the data in the contacts list (e.g. change in location of subscriber may result in change of admin defined contacts).

At operation 760, the contact list is updated based on the information received at operation 750. The updates may be part of an automatic maintenance process, triggered by the subscriber, or both.

The operations included in process 700 are for illustration purposes. Pre-populating and dynamically maintaining contacts lists based on a variety of sources including administrator defined groups may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-readable storage medium with instructions stored thereon for managing contacts list information in a communication system, the instructions comprising:
    determining a plurality of contact information sources associated with a subscriber based on at least one from a set of: a location, an organizational position, a permission level, a relationship within an organization, a preference, and a communication pattern of the subscriber;
    receiving contact information associated with the subscriber from the plurality of sources comprising at least one from a set of: an organizational directory server, a personal directory server, a custom directory server, and a communication server;
    deriving entries for a contacts list for the subscriber by analyzing, categorizing, and customizing the received contact information over a predefined period of time, the predefined period of time being determined based on an organizational position of the subscriber;
    receiving administrator defined contacts of at least one from a set of local transportation and local helpdesk contacts for the subscriber;
    customizing the administrator defined contacts based on the subscriber's location, organizational position, and permission level; and
    pre-populating the contacts list for the subscriber based on the derived entries and the administrator defined contacts upon one of: activation of the subscriber's subscription and a request by the subscriber.

2. The computer-readable medium of claim 1, further comprising:
dynamically updating the contacts list in response to a change in the received contact information, wherein the received contact information includes presence information.

3. The computer-readable medium of claim 1, wherein the contacts list is configured to enable the subscriber to facilitate multimodal communications in a social networking environment.

4. The computer-readable medium of claim 1, wherein the plurality of contact information sources is determined based on at least one of: analyzing usage and communication patterns of the subscriber and receiving input from the subscriber.

5. A method to be executed at least in part in a computing device for managing contacts list information in a multimodal communication system, the method comprising:
determining a plurality of contact information sources associated with a subscriber based on at least one from a set of: a location, an organizational position, a permission level, a relationship within an organization, a preference, and a communication pattern of the subscriber;
receiving contact information associated with the subscriber from the plurality of sources comprising at least one from a set of: an organizational directory server, a personal directory server, a custom directory server, and a communication server;
deriving entries for a contacts list for the subscriber by analyzing, categorizing, and customizing the received contact information over a predefined period of time, the predefined period of time being determined based on an organizational position of the subscriber;
receiving administrator defined contacts of at least one from a set of local transportation and local helpdesk contacts for the subscriber;
customizing the administrator defined contacts based on the subscriber's location, organizational position, and permission level; and
pre-populating the contacts list for the subscriber based on the derived entries and the administrator defined contacts upon one of: activation of the subscriber's subscription and a request by the subscriber.

6. The method of claim 5, further comprising:
determining at least one data source associated with the subscriber to be data mined; and
data mining the at least one data source to derive additional contact information for pre-populating the contacts list for the subscriber.

7. The method of claim 6, wherein the at least one data source includes usage history and communication patterns associated with the subscriber employing a communication application.

8. The method of claim 5, the administrator defined contacts are further customized based on at least one from a set of: a relationship within an organization, a preference, and a communication pattern.

9. The method of claim 5, further comprising:
dynamically updating the contacts list based on at least one from a set of: a change in the subscriber's attribute, a change in received contact information, and a change in subscriber's location.

10. The method of claim 1, wherein the contacts list is further pre-populated in response to the subscriber joining the multimodal communication system.

11. The method of claim 5, wherein the analysis, categorization, and customization are performed based on a subscriber's attribute.

12. The method of claim 5, wherein at least a portion of the contacts list entries include dynamically updated presence information.

13. The method of claim 5, wherein the multimodal communication system is configured to facilitate at least one from a set of: audio communication, video communication, electronic mail exchange, text messaging, conferencing, application sharing, and data sharing.

14. A communication system for managing contacts list information in a multimodal communication system, the system comprising:
a server configured to:
determine a plurality of contact information sources associated with a subscriber based on at least one from a set of: a location, an organizational position, a permission level, a relationship within an organization, a preference, and a communication pattern of the subscriber;
receive contact information associated with the subscriber from the plurality of sources comprising at least one from a set of: an organizational directory server, a personal directory server, a custom directory server, and a communication server;
derive entries for a contacts list for the subscriber by analyzing, categorizing, and customizing the received contact information over a predefined period of time, the predefined period of time being determined based on an organizational position of the subscriber;
receive administrator defined contacts of at least one from a set of local transportation and local helpdesk contacts for the subscriber;
customize the administrator defined contacts based on the subscriber's location, organizational position, and permission level; and
pre-populate the contacts list for the subscriber based on the derived entries and the administrator defined contacts upon one of: activation of the subscriber's subscription and a request by the subscriber.

15. The system of claim 14, wherein the server is further configured to derive the entries from the received contact information based on at least one of: data mining usage and communication pattern records associated with the subscriber and analyzing the contact information based on a subscriber's attribute.

16. The system of claim 15, wherein the server is further configured to derive the entries from the received contact information by categorizing the contacts list entries based on at least one from a set of: a subscriber preference, an organizational default rule, and attributes of the contacts list entries.

17. The system of claim 14, wherein the server is further configured to receive the contact information from at least one from a set of: a database server and an endpoint of the communication system.

18. The system of claim 14, wherein the server is further configured to dynamically update the contacts list entries based on at least one from a set of: organization level rules, changes to the subscriber's attribute, changes in the received contact information, changes in the subscriber's location, and a subscriber preference.

* * * * *